United States Patent
Bolan et al.

(10) Patent No.: US 11,074,348 B2
(45) Date of Patent: Jul. 27, 2021

(54) SECURING AND CHANGING IMMUTABLE DATA IN SECURE BOOTUP

(71) Applicant: International Business Machines Corporation, Armonk, NY (US)

(72) Inventors: Timothy V. Bolan, Endwell, NY (US); Patrick J. Callaghan, Vestal, NY (US); Pu Liu, Vestal, NY (US); Timothy R. Seeger, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 377 days.

(21) Appl. No.: 15/685,481

(22) Filed: Aug. 24, 2017

(65) Prior Publication Data

US 2019/0065750 A1  Feb. 28, 2019

(51) Int. Cl.
*G06F 21/00* (2013.01)
*H04L 29/06* (2006.01)
(Continued)

(52) U.S. Cl.
CPC .......... *G06F 21/575* (2013.01); *G06F 9/4401* (2013.01); *G06F 12/1408* (2013.01);
(Continued)

(58) Field of Classification Search
CPC .. G06F 21/575; G06F 9/4401; G06F 12/1408; G06F 21/78; H04L 9/0838; H04L 2209/24
See application file for complete search history.

(56) References Cited

U.S. PATENT DOCUMENTS

| 6,560,706 B1 | 5/2003 | Carbajal et al. |
| 7,716,470 B2 | 5/2010 | Stillerman et al. |

(Continued)

FOREIGN PATENT DOCUMENTS

| CN | 101576944 A | 11/2008 |
| WO | 2015143989 A1 | 3/2015 |

OTHER PUBLICATIONS

PCT, International Searching Authority, PCT/IBM2018?056317, dated Dec. 27, 2018.
(Continued)

*Primary Examiner* — Anthony D Brown
*Assistant Examiner* — Rodman Alexander Mahmoudi
(74) *Attorney, Agent, or Firm* — Garg Law Firm, PLLC; Rakesh Garg; Edward Wixted

(57) ABSTRACT

A set of root keys is loaded as a first part of a secure boot process of a secure system. a first trusted key from a set of trusted keys is verified using a first root key from the set of root keys as a second part of the secure boot process. The set of trusted keys is loaded when an affirmative verification for a subset of trusted keys is received. The subset of trusted keys includes the first trusted key. As a third part of the secure boot process, an immutable portion of a file is validated using the first trusted key. As a fourth part of the secure boot process, the file is loaded when each portion of the file is successfully validated. The first, second, third, and fourth parts of the secure boot process occur before an integrity management configuration takes over the secure boot process.

25 Claims, 7 Drawing Sheets

(51) Int. Cl.
*G06F 21/57* (2013.01)
*H04L 9/08* (2006.01)
*H04L 9/32* (2006.01)
*G06F 21/64* (2013.01)
*G06F 9/4401* (2018.01)
*G06F 12/14* (2006.01)
*G06F 21/78* (2013.01)

(52) U.S. Cl.
CPC .............. *G06F 21/64* (2013.01); *G06F 21/78* (2013.01); *H04L 9/0838* (2013.01); *H04L 9/0891* (2013.01); *H04L 9/0897* (2013.01); *H04L 9/3234* (2013.01); *H04L 9/3247* (2013.01); *H04L 2209/24* (2013.01)

(56) References Cited

U.S. PATENT DOCUMENTS

| | | | |
|---|---|---|---|
| 8,161,154 B2* | 4/2012 | Elcock | H04L 63/08 709/225 |
| 8,892,858 B2 | 11/2014 | Smith et al. | |
| 9,223,982 B2 | 12/2015 | Adams et al. | |
| 9,710,652 B1 | 7/2017 | Condra et al. | |
| 2008/0141338 A1 | 6/2008 | Kim et al. | |
| 2009/0327680 A1* | 12/2009 | Dale | G06F 21/575 713/2 |
| 2011/0010543 A1* | 1/2011 | Schmidt | H04W 12/10 713/168 |
| 2011/0035808 A1* | 2/2011 | Butler | G06F 21/575 726/27 |
| 2011/0185165 A1* | 7/2011 | Haga | G06F 21/57 713/2 |
| 2013/0246692 A1* | 9/2013 | Macor | G07D 9/002 711/103 |
| 2014/0053278 A1 | 2/2014 | Dellow et al. | |
| 2014/0205092 A1* | 7/2014 | Hartley | H04L 9/0897 380/44 |
| 2014/0359296 A1* | 12/2014 | Alrabady | H04L 9/3247 713/176 |
| 2015/0186651 A1 | 7/2015 | Kim et al. | |
| 2017/0039352 A1* | 2/2017 | Volkening | G06F 21/57 |

OTHER PUBLICATIONS

M. Nyström, M. Nicholes, and V. J. Zimmer. "UEFI Networking and Pre-OS Security," Intel Technology Journal 15.1 (2011).. Retrieved from Internet using: https://www.researchgate.net/profile/Vincent_Zimmer/publication/235258577_UEFI_Networking_and_Pre-OS_Security/links/0fcfd510b3ff7138f4000000/UEFI-Networking-and-Pre-OS-Security.pdf.

"Adding boot signature checking to package-based Oses," IP.com Disclosure No. IPCOM000243901D, Oct. 27, 2015.

* cited by examiner

SECURING AND CHANGING IMMUTABLE DATA IN SECURE BOOTUP

TECHNICAL FIELD

The present invention relates generally to a method, system, and computer program product for maintaining the integrity of system boot policies or rules while applying policy changes. More particularly, the present invention relates to a method, system, and computer program product for securing and changing immutable data in a secure bootup.

BACKGROUND

Booting is a process of starting up a data processing system. The boot process uses a set of files and/or data components to configure the system appropriately.

Hereinafter, a reference to a file, boot file, or a component, in the context of a boot process is a reference to a data file, or a data component, or both, that is usable in a given boot process, unless expressly distinguished where used. Such files may include, but are not limited to configuration files or data, policies or rules, executable code, code libraries, and data usable for digital signatures or keys.

Hereinafter, a reference to a key is a reference to any suitable code, data, or method of encoding or decoding data, signing data, validating data, verification of data or identity, cryptography. Such a code, data, or method contemplated within the scope of the term "key" includes, but is not limited to, public and private keys (or keypairs). Some other examples of code, data, or methods contemplated within the scope of keys include hashing algorithms and hash values. These examples of keys are not intended to be limiting. From this disclosure, those of ordinary skill in the art will be able to conceive many other codes, data, or methods usable in a similar manner, and the same are contemplated within the scope of the illustrative embodiments.

Trusted computing (TC) is a branch of data processing where the systems used are exceptionally secure as compared to general purpose computers. As one point of distinction, a system used in TC is booted according to a secure booting process. A secure booting process employs at least three things—a set of files that are regarded as unchangeable or immutable, a method for verifying the integrity of those files, and using those files in a boot process up to a point from where an integrity management configuration takes over and continues the bootup and/or the operation of the TC system.

A system operating in a TC environment is interchangeably referred to herein as a secure system. Security Enhanced Linux (SELinux) is one non-limiting example of a secure system with respect to which one or more embodiments described herein can be deployed.

An integrity management configuration ensures the integrity of the files used in booting and operating a secure system. Integrity Management Architecture (IMA) is one non-limiting example of such an integrity management configuration and is presently used in TC environments.

The illustrative embodiments recognize that in booting a secure system, the integrity management configuration does not take-over or control the secure boot process or further operations of the secure system until at least some of the secure boot process steps have completed. The secure bootup steps—which are executed without the benefit of the integrity management configuration and prior to the integrity management configuration monitoring or controlling the boot process and further operations—are referred to herein as vulnerable steps (v-steps).

The illustrative embodiments recognize that the integrity of a file used in the v-steps is susceptible to malicious or undesirable modifications at least until the v-steps have completed and the integrity management configuration has taken over. Such modifications can be entered into the secure system without the benefit of the integrity management configuration oversight and can compromise the security of the TC environment.

The illustrative embodiments recognize that one such file that is used in the v-steps of a secure system is a policy file. The policy file specifies the rules and policies that are applicable to many aspects of the configuration and operation of the secure system, including but not limited to allowing or restricting data communications with other systems over data networks. The susceptibility of the system during the v-steps can allow malicious manipulation of the policy file, causing backdoors, pinholes, and other breaches to be created in the TC environment.

The presently available integrity management configurations, such as IMA, fail to protect the policy file from undesirable modifications during the v-steps. A locking mechanism is available under present implementations to lock the policy file from further manipulation after the policies from the file have been loaded. However, the illustrative embodiments recognize that locking the policy file also prevents legitimate modifications and updates to the policy file that may be necessary to address a desirable change in the secure system.

The illustrative embodiments recognize that IMA and presently available integrity management configurations do not provide a solution for securing the policy file during the v-steps, or a solution for modifying the policy file in a secure manner that does not create a security gap during the modification.

SUMMARY

The illustrative embodiments provide a method, system, and computer program product. An embodiment includes a method that loads, using a processor and a memory, as a first part of a secure boot process of a secure system, a set of root keys. The embodiment verifies, as a second part of the secure boot process, a first trusted key from a set of trusted keys using a first root key from the set of root keys. The embodiment loads the set of trusted keys responsive to receiving affirmative verification for a subset of trusted keys, the subset of trusted keys including the first trusted key. The embodiment validates, as a third part of the secure boot process, an immutable portion of a file using the first trusted key. The embodiment loads, as a fourth part of the secure boot process, the file responsive to each portion of the file being successfully validated, wherein the first part, the second part, the third part, and the fourth part of the secure boot process occur before an integrity management configuration takes over the secure boot process. Thus, the embodiment secures an immutable file during certain vulnerable steps in a secure bootup process where an integrity management configuration takes over after such steps have been performed.

Another embodiment further stores in a staging area a changed portion of the file. The embodiment computes, using a second trusted key, a new signature corresponding to the changed portion. The embodiment stores, responsive to the second key not being in the set of trusted keys, the new trusted key such that the new trusted key will be included in the set of trusted keys upon a reboot of the secure system. The embodiment instructs the reboot of the secure system. Thus, the embodiment enables changing an immutable file after the file has been loaded and secured by an integrity management configuration, during or after a secure bootup process.

Another embodiment further configures the staging area, wherein data saved in the staging area before rebooting the secure system remains accessible to the secure system after the rebooting. Thus, the embodiment allows making the changes to an immutable file in one secure boot session and picking up the changes in another secure boot session.

Another embodiment further verifies, as a first portion of a secure reboot process, the second trusted key using a second root key from the set of root keys. The embodiment validates the changed portion using the second trusted key responsive to the second trusted key receiving an affirmative verification. The embodiment loads the changed portion responsive to the second trusted key validating the changed portion during the secure reboot process. Thus, the embodiment enables making and accepting legitimate changes to an immutable secure boot file while maintaining the integrity and security of the changed file during the vulnerable steps of the secure boot process.

Another embodiment further stores in a staging area a changed portion of the file. The embodiment computing, using a second trusted key, a new signature corresponding to the changed portion, wherein the second trusted key is already a member of the set of trusted keys. The embodiment instructs the reboot of the secure system. Thus, the embodiment enables reuse of existing trusted keys for securing the changes to an immutable secure boot file.

Another embodiment further fails, responsive to receiving a negative validation of second immutable portion of the file, the secure boot process. Thus, the embodiment enables averting undesirable states of the secure system when the integrity of the immutable file appears to have been compromised even before the integrity management configuration becomes available in the secure boot process.

Another embodiment further selects a trust service provider system based on the first root key. The embodiment sends the first trusted key to the trust service provider system. The embodiment receives one or an affirmative and a negative verification relative to the first trusted key. Thus, the embodiment provides a method by which to validate the integrity of the key that has been used to validate the integrity of the immutable file.

Another embodiment further sends the first root key to the trust service provider system. Thus, the embodiment provides another method by which to validate the integrity of the key that has been used to validate the integrity of the immutable file.

Another embodiment further fails, responsive to receiving a negative verification of a second trusted key from a trust service provider system, the secure boot process. Thus, the embodiment enables averting undesirable states of the secure system when the integrity of the immutable file appears to have been compromised even before the integrity management configuration becomes available in the secure boot process.

Another embodiment further determines, during the validating, whether a signature stored relative to the immutable portion is computable using the first trusted key. The embodiment affirms a validity of the immutable portion responsive to a use of the first trusted key on the immutable portion resulting in the signature. Thus, the embodiment ensures the validity of a portion of the immutable file during the vulnerable steps in the secure bootup process where an integrity management configuration is not yet activated.

In another embodiment, the immutable portion of the file is an entirety of the file. Thus, the embodiment ensures the validity of the entire immutable file during the vulnerable steps in the secure bootup process where an integrity management configuration is not yet activated.

In another embodiment, a root key in the set of root keys comprises data that is inherently trusted without verification from a trust service provider system. Thus, the embodiment relies on a limited amount of inherently secure or reliable data to ensures the validity of the immutable file during the vulnerable steps.

An embodiment includes a computer usable program product. The computer usable program product includes one or more computer-readable storage devices, and program instructions stored on at least one of the one or more storage devices. Thus, the embodiment provides a computer usable program product which secures an immutable file during certain vulnerable steps in a secure bootup process where an integrity management configuration takes over after such steps have been performed.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories. Thus, the embodiment provides a system which secures an immutable file during certain vulnerable steps in a secure bootup process where an integrity management configuration takes over after such steps have been performed.

An embodiment includes a method that verifies, during a secure boot process of a secure system, a subset of trusted keys from a set of trusted keys using a first root key from a set of root keys, the subset of trusted keys including the first trusted key. The embodiment validates, during the secure boot process, an immutable portion of a file using the first trusted key. The embodiment loads, during the secure boot process, the file responsive to each portion of the file being successfully validated, wherein the verifying, the validating, and the loading occur before an integrity management configuration takes over the secure boot process. Thus, the embodiment secures an immutable file during certain vulnerable steps in a secure bootup process where an integrity management configuration takes over after such steps have been performed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
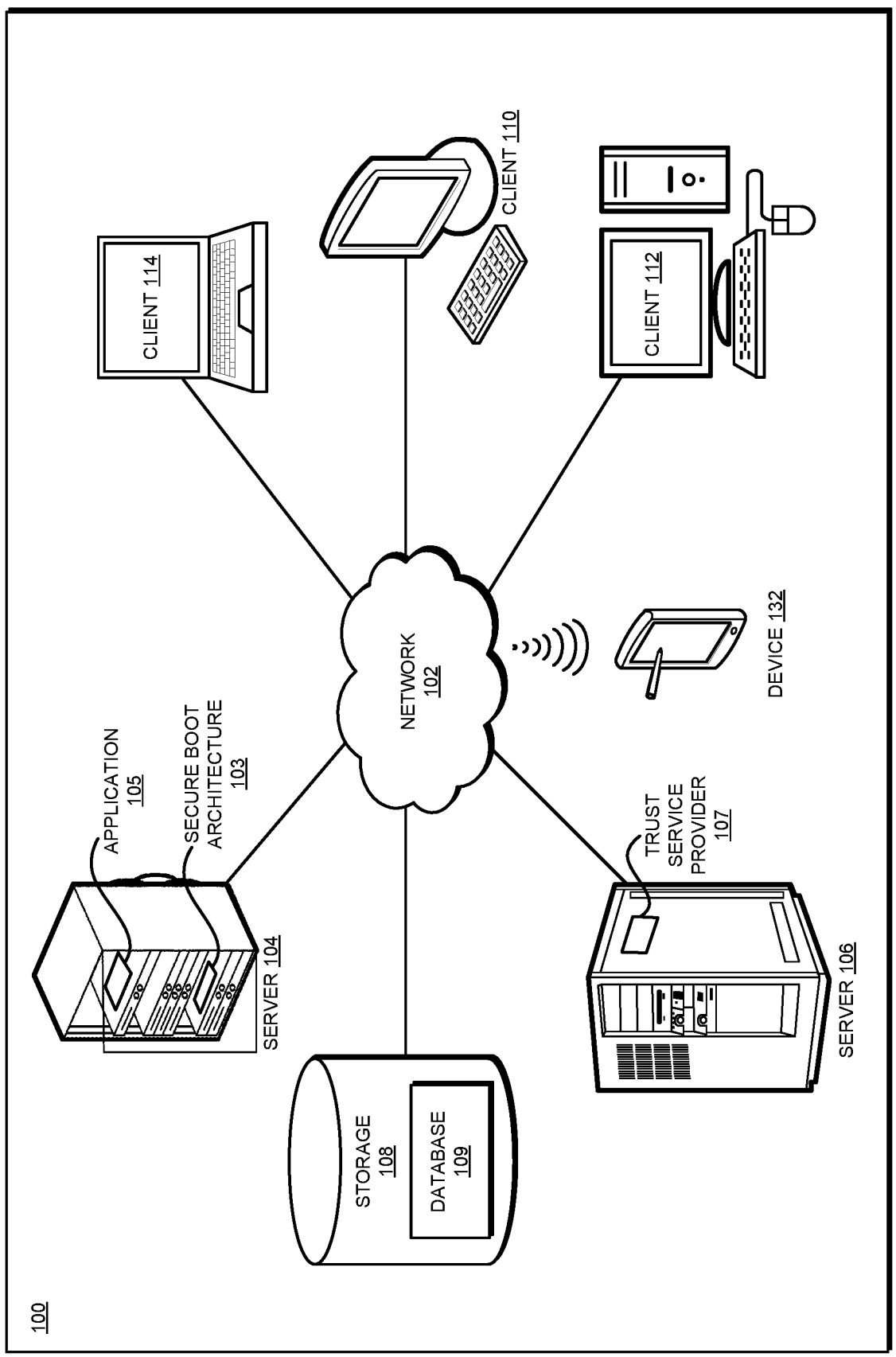
FIG. 1 depicts a block diagram of a network of data processing systems in which illustrative embodiments may be implemented.

The illustrative embodiments recognize that the presently available tools or solutions do not address these needs or provide adequate solutions for these needs. The illustrative embodiments used to describe the invention generally address and solve the above-described problems and other problems related to securing and changing immutable data in a secure bootup.

An embodiment can be implemented as a software application. The application implementing an embodiment can be configured as a modification of an existing secure boot process of a secure system, as a separate application that operates in conjunction with an existing secure boot process, a standalone application, or some combination thereof.

An embodiment maintains a set of keys called root keys. A root key is a key that is known within the secure system or the TC to be inherently trustworthy with or without verification. The root keys can be maintained in any suitable type of repository.

For a set of immutable files or components, an embodiment maintains a repository of trusted keys. The embodiment uses a trusted key to sign a file or component used at least in the secure boot process. For example, the embodiment computes signature data for a file or a component using a trusted key. The embodiment associates the signature data and the corresponding trusted key with that file or component.

The signature is usable to verify the integrity of the file or component with which the signature is associated. For example, if the contents of the file are changed after a signature is generated, the changed file will not compute to the same signature using the same trusted key, thus indicating that the contents of the file have been manipulated.

A trusted key is not inherently trustworthy in the manner of a root key. A trusted key can be verified by using a root key with a trust service. For example, in one example trusted key verification operation, a trusted key and a root key are provided to a trust service provider (TSP) system, which affirms or declines the trusted key based on the information in the TSP system. In another example verification operation, a trusted key may be provided to a TSP system associated with a root key, and the TSP system affirms or declines the trusted key based on the information maintained by the TSP system.

These examples of key verification using a trust service are not intended to be limiting. From this disclosure, those of ordinary skill in the art will be able to conceive many other ways of using a trust service to verify keys, and the same are contemplated within the scope of the illustrative embodiments.

If the signature of any of the immutable files (or components) fails to validate the contents of the corresponding file (or component), an embodiment fails the secure boot process. Failing a secure boot process can result in halting the bootup process, redirecting the bootup process, or taking another suitable action where secure system is prevented from operating, prevented from participating in the TC environment, the security of the secure system is re-established before the secure system boots up and participates in the TC environment, or some combination of these and many other possible actions.

If the embodiment determines that each trusted key associated with each signature has been affirmatively verified, and that each signature successfully validates the corresponding immutable file or component, the embodiment allows the secure boot process to proceed.

One such immutable file is the policy file. A signature may be associated with the entire policy file, or different signatures may be associated with different modules of a modular policy file. Only when each signature associated with a policy file or modules thereof, as the case may be, successfully validates the policy file, the embodiment allows the policies from the policy file to load. The embodiment then locks the policy file such that the policy file cannot be modified while the policies are loaded, and the policy file or a policy therefrom cannot be reloaded while the secure system is in operation.

An embodiment creates a staging area for storing data in a non-volatile manner. In other words, data stored in the staging area persists for use in the secure system even if the secure system is shutdown and rebooted. In one embodiment, the staging area is formed in a data storage device within the secure system. In another embodiment, the staging area is in a data storage that is accessible from the secure system over a data network.

Some embodiments and operations thereof are described and illustrated using desirable changes in a policy file only as a non-limiting example. From this disclosure, those of ordinary skill in the art will be able to adapt an embodiment to perform changes to other immutable files or components in a similar manner in a secure system boot process, and such adaptations are contemplated within the scope of the illustrative embodiments.

Using the policy file as a non-limiting example, an embodiment determines that a change has to be made to the policy file after the policy file has been loaded and locked. For example, consider that the policy file is a modular policy file and a module has to be added, removed, or changed in the policy file. The embodiment accepts the modified policy file or component for saving in the staging area. For example, if a module is added, the new module alone or with the policy file as modified with the added module is stored in the staging area. Deletes and updates are similarly stored in the staging area.

The embodiment computes, or causes to be computed, a signature for the changed module, the changed policy file, or a signature for each of the changed module and the changed file, as the implementation case may be. The embodiment saves a new signature with the corresponding module or file, as the case may be. In one embodiment, the new signature is saved within a changed file, file-module, or component, as the case may be.

Each new signature is computed using a corresponding trusted key in a manner described herein. The trusted key used to compute the new signature can be an existing trusted key or a new trusted key. If an existing trusted key is used, the trusted key already exists in the trusted key repository. If a new trusted key is used, the embodiment stores the new trusted key that was used for computing a new signature. In one embodiment, the new trusted key is stored in the same repository where the other trusted keys are stored for the secure system boot process.

After the changed file, module, or component with a corresponding new signature has been saved in the staging area, and after the corresponding new trusted key has been saved in a suitable trusted key repository, an embodiment causes the secure system to reboot. If an existing trusted key is used, then the embodiment causes the reboot to occur after the changed file and the corresponding new signature has been saved in the staging area. Any reference herein to a new trusted key for creating a new signature should be understood as a reference to an existing/previously used trusted key, or a previously unused trusted key, as the implementation may decide to use under a given circumstance.

During the reboot, an embodiment causes the root keys to be loaded. The embodiment accesses each trusted key stored in each trusted key repository to be used with the secure system boot process. This access includes accessing any repository that may be holding a new trusted key.

The embodiment verifies each trusted key—including each new trusted key—in a manner described herein. When each new and previously used trusted key has been verified, the embodiment uses the trusted keys to validate the corresponding signatures of or in the immutable files, modules, or components. This validation includes validating the example changed policy file described above.

When the new signature of the changed file, module, or component is successfully validated, the embodiment causes the changed file, module, or component to be loaded. Where applicable, the file, module, or component—e.g., the changed policy file in this example—may be locked in a manner described earlier. The secure boot process continues normally and an integrity management configuration takes over the secure system bootup and operation thereafter.

The manner of securing and changing immutable data in a secure bootup described herein is unavailable in the presently available methods. A method of an embodiment described herein, when implemented to execute on a device or data processing system, comprises substantial advancement of the functionality of that device or data processing system in securing the immutable files during the v-steps of a secure boot process, allowing desirable changes to be made to immutable files even after such files are locked, and allowing the desirable changes to become a part of the immutable files without causing a gap in the security or integrity of the immutable files.

The illustrative embodiments are described with respect to certain types of files, modules, components, secure systems, integrity management configurations, keys, signatures, trust services, staging areas, validations, verifications, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
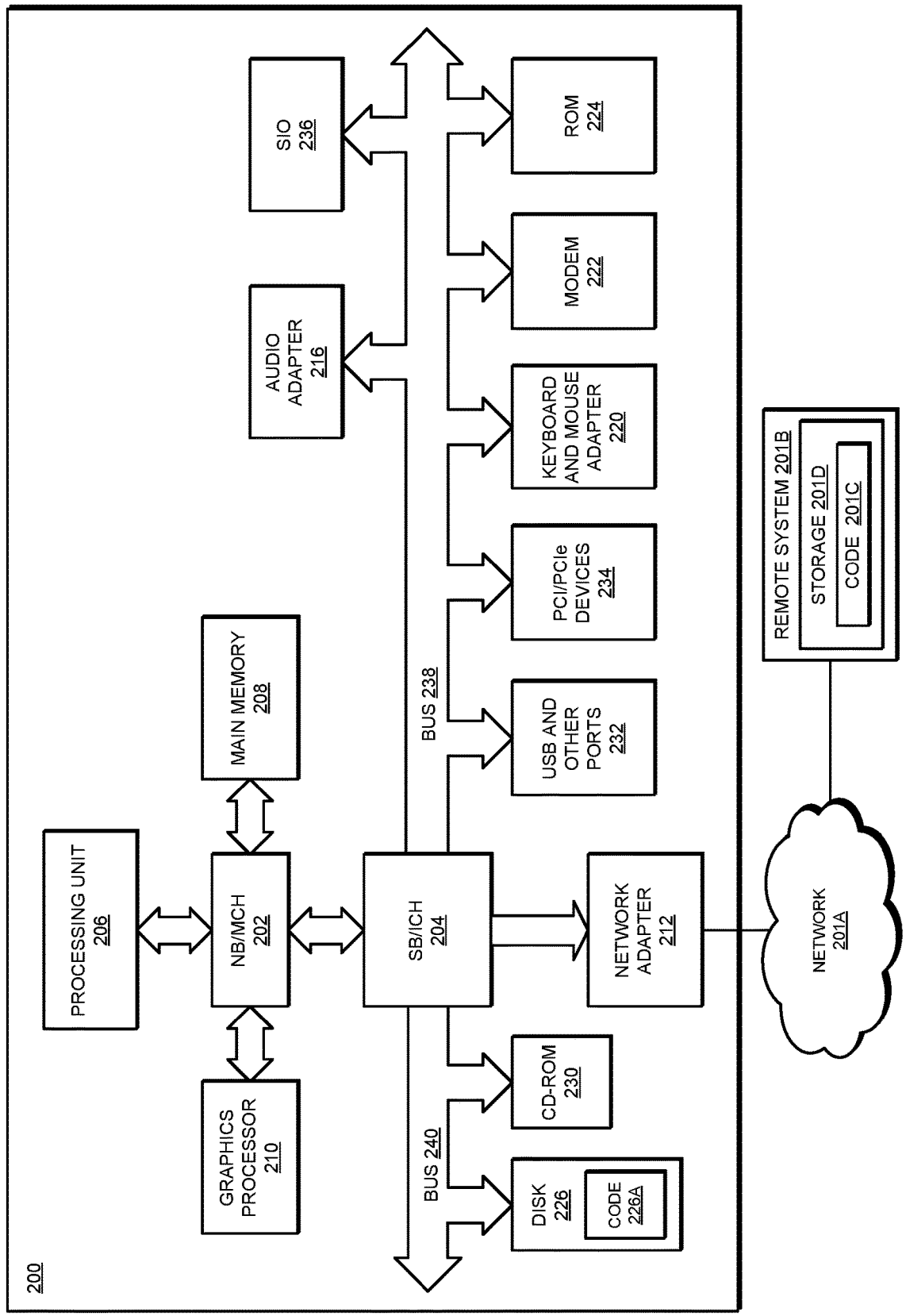
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 modifies the secure boot process implemented using a suitable secure boot architecture 103, which provides a suitable integrity management configuration, in a manner described herein. Application 105 secures the immutable files (not shown) during the v-steps of a secure boot process, allows desirable changes to be made to immutable files even after such files are locked, and allows the desirable changes to become a part of the immutable files without causing a gap in the security or integrity of the immutable files, as described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
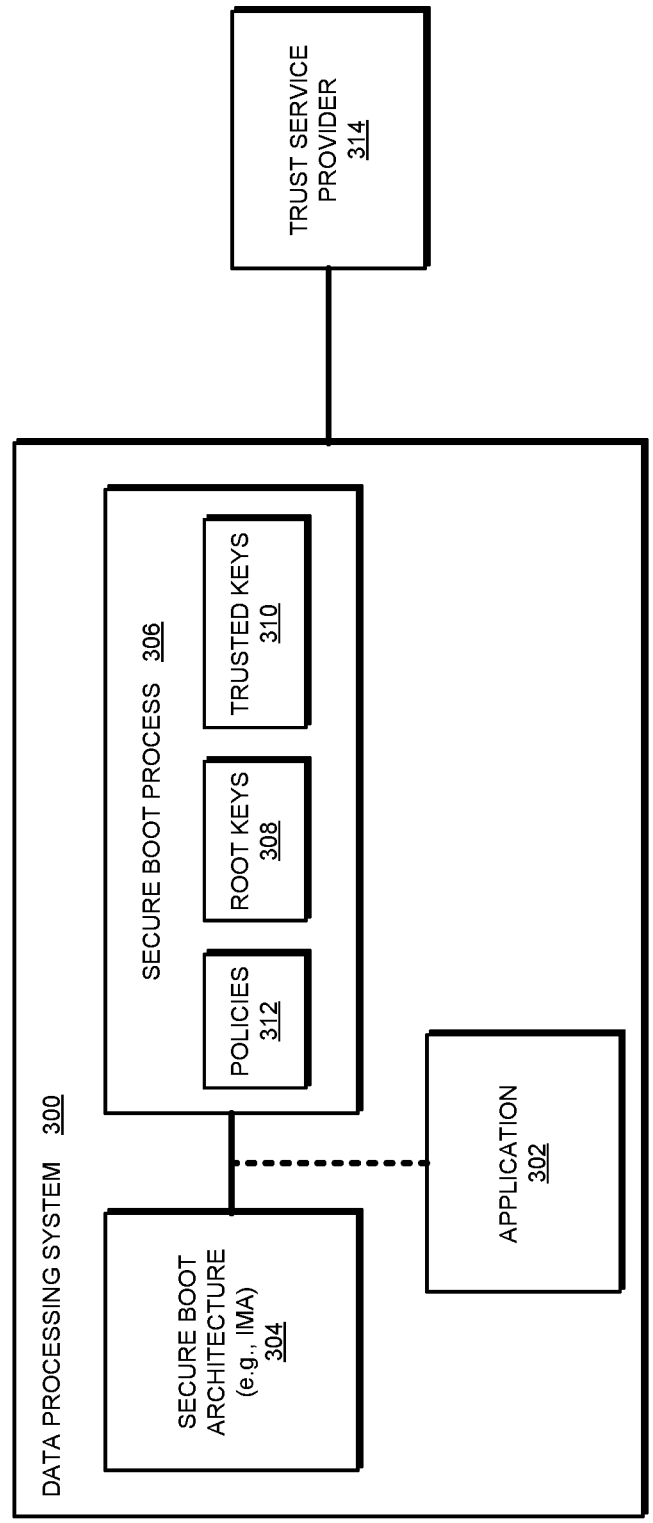
FIG. 3 depicts a block diagram of an example configuration for securing and changing immutable data in a secure bootup in accordance with an illustrative embodiment.

With reference to FIG. 3, this figure depicts a block diagram of an example configuration for securing and changing immutable data in a secure bootup in accordance with an illustrative embodiment. Data processing system 300 is a secure system that is to be securely booted and where an immutable file has to be securely modified in a manner described herein. Application 302 is an example of application 105 in FIG. 1.

Secure boot architecture 304 is an example of secure boot architecture 103 in FIG. 1 and participates in secure boot process 306. Process 306 uses a set of root keys 308 and a set of trusted keys 310 to load or use a set of immutable files, such as but not limited to policies files 312. Trust service provider 314 verifies one or more of trusted keys 310 with the use of one or more of root keys 308.

Figure 4:
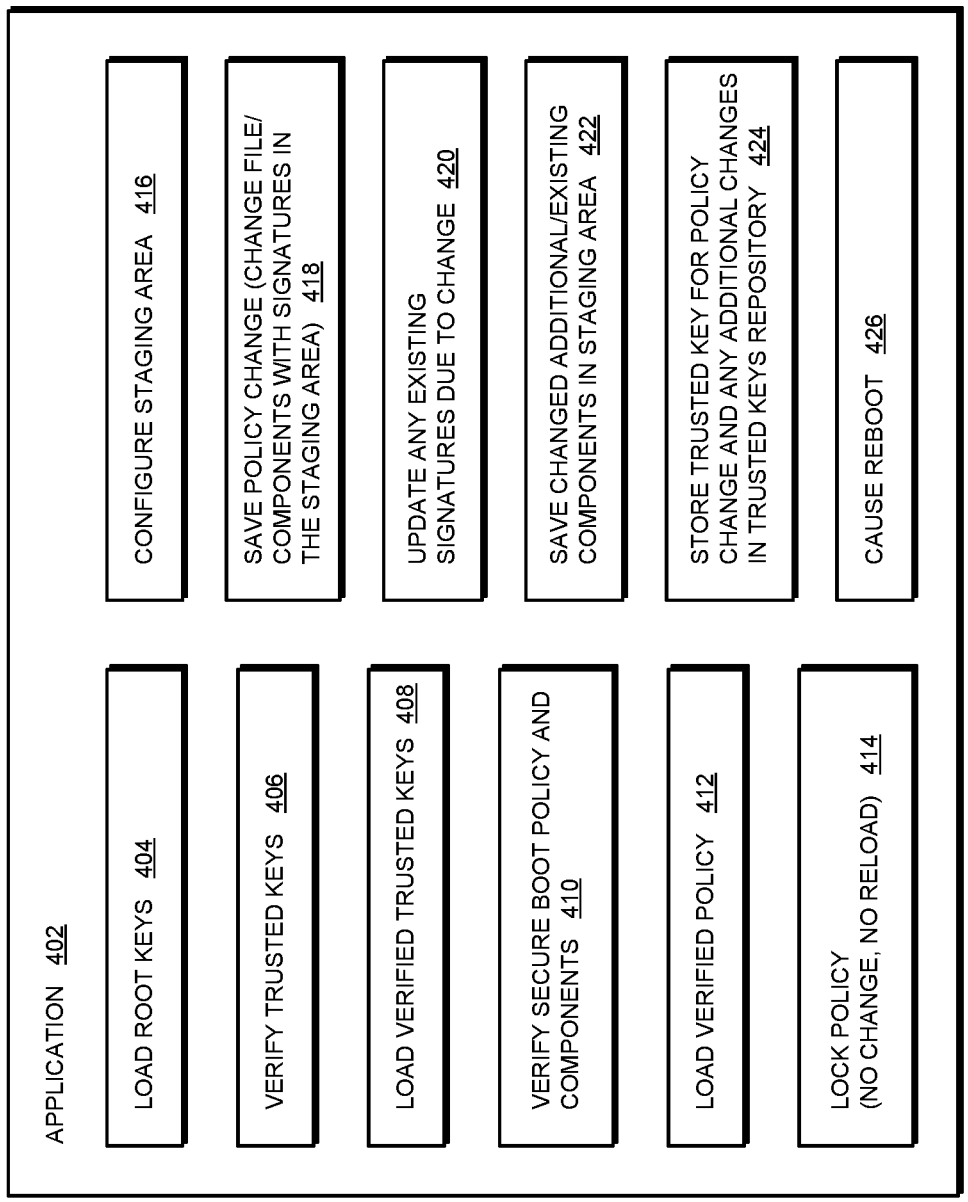
FIG. 4 depicts a block diagram of an application for securing and changing immutable data in a secure bootup in accordance with an illustrative embodiment.

With reference to FIG. 4, this figure depicts a block diagram of an application for securing and changing immutable data in a secure bootup in accordance with an Illustrative embodiment. Application 402 is an example of application 302 in FIG. 3.

Function 404 loads the set of root keys. Loading is a process of making a key, data, or code usable in the secure system, in the boot process, normal operation, or both.

Function 406 verifies a trusted key using a loaded root key and trust service provider, e.g., provides 314 in FIG. 3. Function 408 loads a verified trusted key.

Function 410 verifies an immutable file, module, or component, using a verified and loaded trusted key. For example, the immutable file may be an immutable secure boot policy file. The verification establishes that the immutable file, module, or component has not changed since the associated signature was computed.

Function 412 loads the verified file, module, or component. For example, component 412 loads one or more policies from the verified policy file. Function 414 optionally locks a file, module, or component, as the case may be, and depending upon the specific implementation.

Function 416 builds or configures a data staging area to persist changes to an immutable file. Again, using the policy file as a non-limiting example, function 418 saves a policy change with a corresponding new signature in the staging area.

Note that in some cases, when a change is made to a module of a file or a component, a new signature may have to be associated with not only the changed module or component but also with the file or another file that might be affected by the change. In such cases, component 420 computes updated signatures for the affected files, modules, or components. Function 422 saves all such changes and the new signatures reflective of the changed or affected files, modules, or components, in the staging area.

Function 424 stores the new trusted keys associated with any new signatures in a suitable trusted key repository. Recomputed signatures of affected files, modules, or components may be computed with an existing trusted key or a new trusted key. If a new trusted key is used, that key is stored as described herein. Optionally, if an existing trusted key is no longer in use, such key may be removed from a trusted key repository.

Component 426 causes the secure system to reboot. Depending upon the implementation, the reboot may be scheduled.

Figure 5:
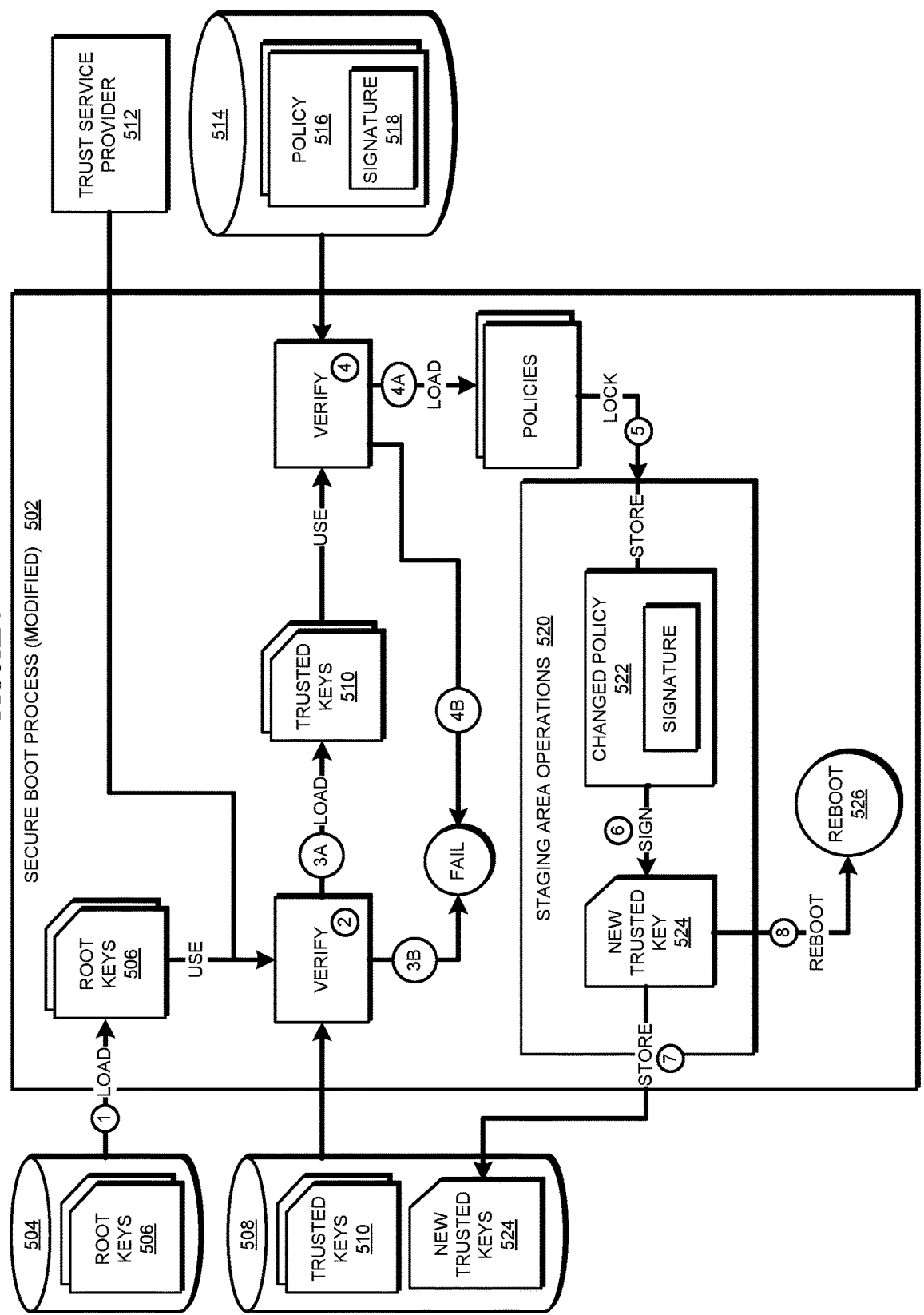
FIG. 5 depicts a process flow diagram of an example process for securing and changing immutable data in a secure bootup in accordance with an illustrative embodiment.

With reference to FIG. 5, this figure depicts a process flow diagram of an example process for securing and changing immutable data in a secure bootup in accordance with an illustrative embodiment. Secure boot process 502 is a modified form of secure boot process implemented by secure boot architecture 103 of FIG. 1, as modified by application 402 of FIG. 4.

Repository 504 stores a set of root keys 506. Repository 508 stores a set of trusted keys 510. Trust service provider 512 operates as described herein. Repository 514 stores an immutable file, e.g., policy file 516. Signature 518 is associated with policy file 516.

Root keys 506 are loaded (1). Verification operation (2) uses root key 506 and trust service provider 512 to verify a trusted key 510. One root key can be used to verify one or more trusted keys. If all trusted keys that are to be used with secure boot process 502 pass verification, secure boot process 502 loads (3A) trusted keys 510. If a trusted key fails verification (3B), secure boot process 502 fails.

A loaded trusted key 510 is used to validate (4) policy file 516. If the policy file is successfully validated, the policies from the policy file are loaded (4A). If the policy file as a whole or a module thereof fails verification (4B), secure boot process 502 fails.

Once the policies from the policy file are loaded, process 502 locks (5) the policy file (or any other immutable file in a similar manner).

A staging area is configured and staging area operations 520 are performed. Changed policy 522 is stored in the staging area. Changed policy 522 is signed (6) using trusted key 524, which may be an existing trusted key or a new trusted key as described earlier herein. When a new trusted key 524 is used, new trusted key 524 is stored (7) in repository 508 or another repository. Reboot (8) of the secure system is instructed. At a suitable time, reboot operation 526 is initiated.

Figure 6:
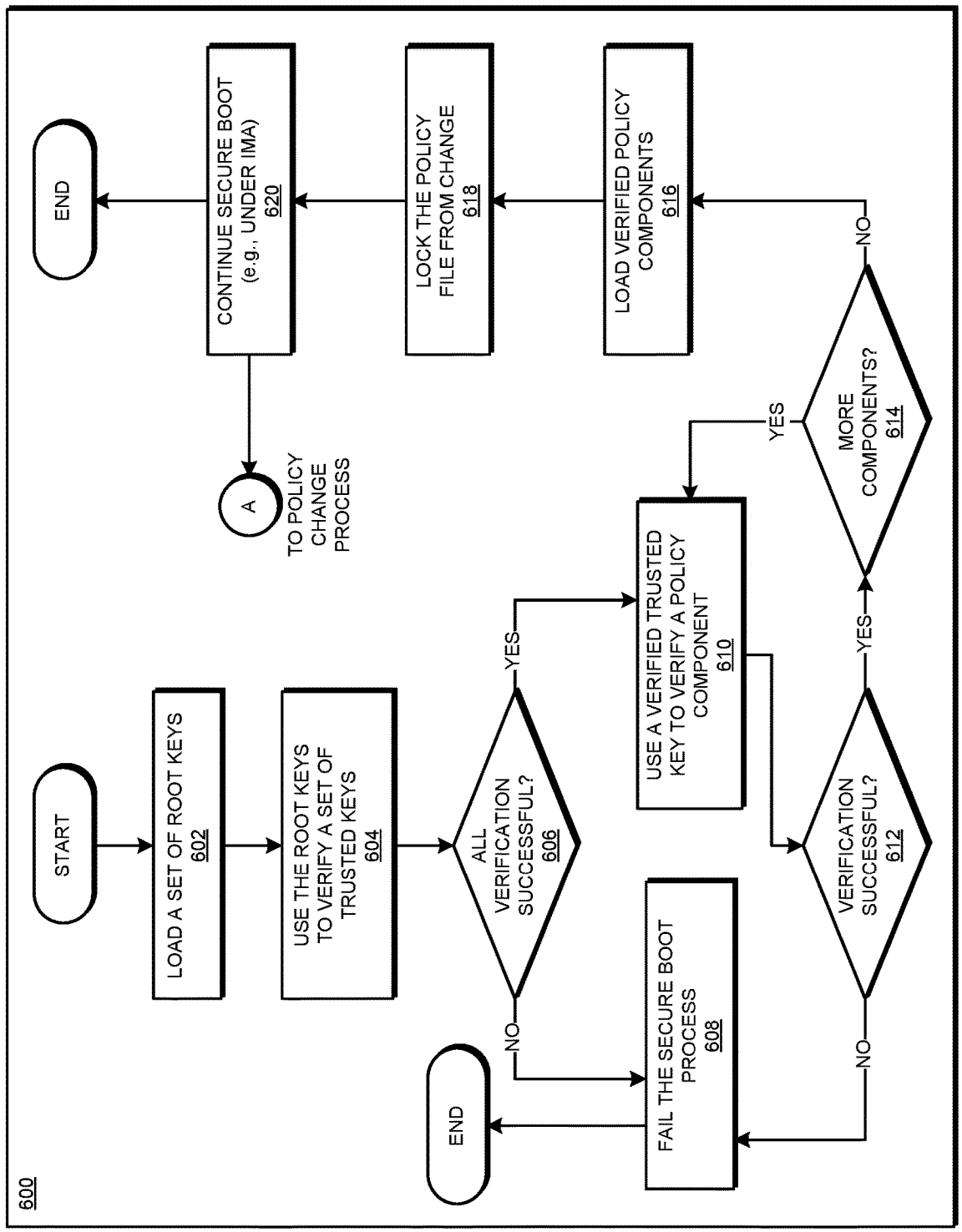
FIG. 6 depicts a flowchart of an example process for securing an immutable file during the v-steps of a secure boot in accordance with an illustrative embodiment.

With reference to FIG. 6, this figure depicts a flowchart of an example process for securing an immutable file during the v-steps of a secure boot in accordance with an illustrative embodiment. Process 600 can be implemented in application 402 in FIG. 4.

The application loads a set of root keys (block 602). The application uses the root keys to verify a set of trusted keys (block 604). For a trusted key verification, the application determines whether all trusted key verification operations are successful (block 606). If any verification is unsuccessful ("No" path of block 606), the application fails the secure boot process (block 608). Process 600 ends thereafter.

If at least a threshold number of verifications are successful ("Yes" path of block 606), the application uses a verified trusted key to validate a policy file or a module or component thereof (block 610). Depending on the implementation, verification of at least one trusted key, a subset of trusted keys, or the entire set of trusted keys may be sufficient to proceed to block 610. The application determines whether a validation is successful (block 612). If the validation is unsuccessful ("No" path of block 612), the application fails the secure boot process and ends process 600 thereafter.

If the validation is successful, the application determines whether more immutable files, modules, or components are to be validated using trusted keys in this manner (block 614). If more validations have to be performed ("Yes" path of block 614), the application returns to block 610. If no more validations are to be performed ("No" path of block 614), the application loads the validated policies, files, modules, or components, as the case may be (block 616). The application locks the policy file, or another suitable loaded immutable file, from change or reloads (block 618).

The application allows the secure boot to continue, e.g., under the protection of a suitable integrity management configuration, such as IMA (block 620). The application may end process 600 thereafter, or exit via exit "A" to enter process 700 of FIG. 7.

Figure 7:
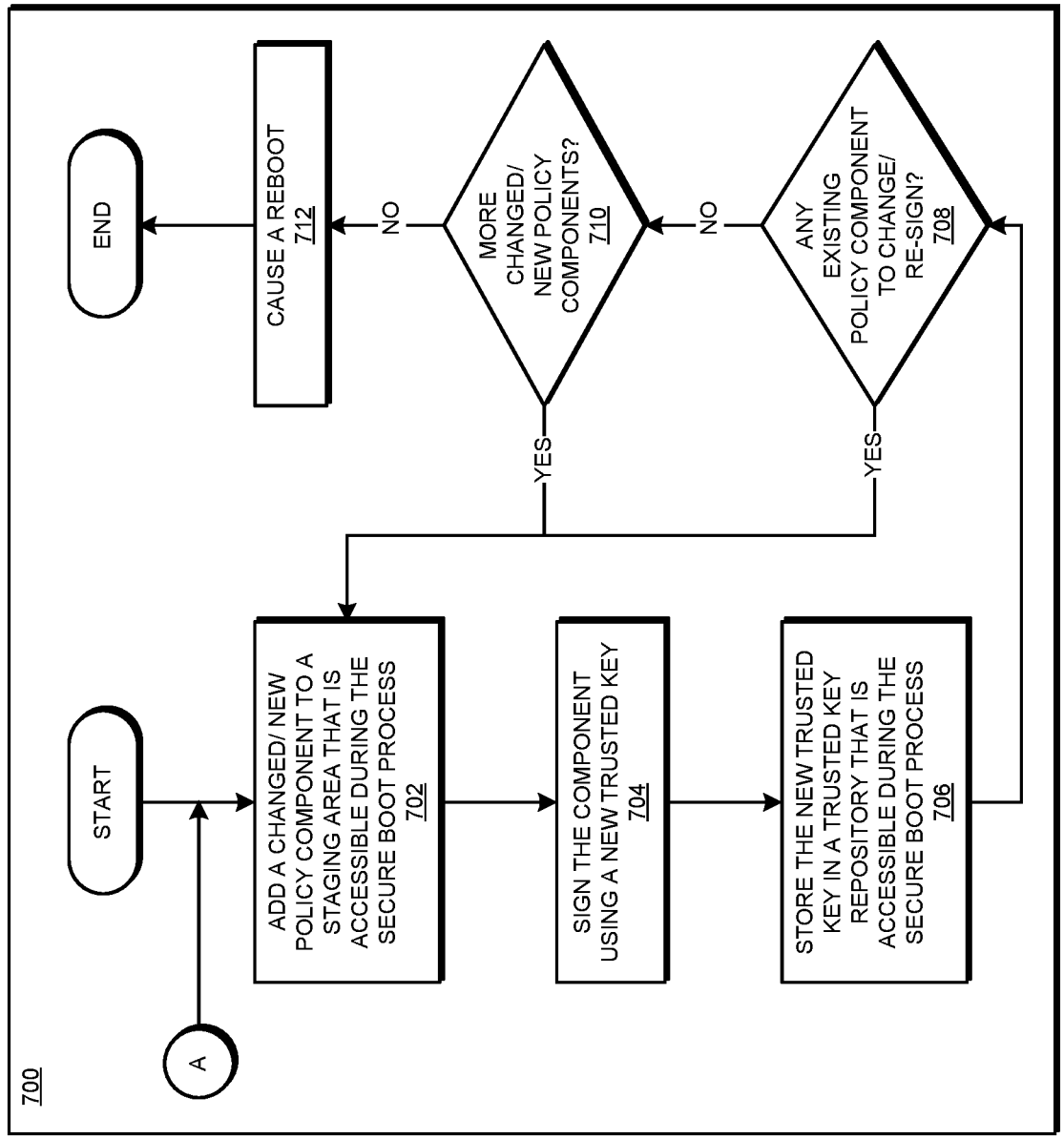
FIG. 7 depicts a flowchart of an example process for changing a locked immutable file for secure boot in accordance with an illustrative embodiment.

With reference to FIG. 7, this figure depicts a flowchart of an example process for changing a locked immutable file for secure boot in accordance with an illustrative embodiment. Process 700 can be implemented in application 402 in FIG. 4.

A policy file change is used as a non-limiting example. The application adds a changed or new policy file or a module thereof, to a staging area that is accessible during a secure boot process (block 702). The application signs the stored file, module, or component using a new trusted key (block 704). The application stores the new trusted key in a suitable repository that will be accessible to the secure boot process as well (block 706).

The application determines whether any existing file, module, or component has been affected by the change stored in the staging area and has to be changed as well (block 708). If an affected file, module, or component has to be changed ("Yes" path of block 708), the application returns to block 702. If no affected file, module, or component has to be changed ("No" path of block 708), the application determines whether more changed or new files, modules, or components have to be stored in the staging area (block 710).

If more changed or new file, module, or component have to be processed ("Yes" path of block 710), the application returns to block 702. If no more new or changed file, module, or component have to be processed ("No" path of block 708), the application causes a reboot to occur at a suitable time, e.g., by composing and sending a reboot instruction to a suitable reboot controller (block 712). The application ends process 700 thereafter.

Thus, a computer implemented method, system or apparatus, and computer program product are provided in the illustrative embodiments for securing and changing immutable data in a secure bootup and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   loading, using a processor and a memory, as a first part of a secure boot process of a secure system, a set of root keys;
   verifying, as a second part of the secure boot process, a first trusted key from a set of trusted keys using a first root key from the set of root keys;

loading the set of trusted keys responsive to receiving affirmative verification for a subset of trusted keys, the subset of trusted keys including the first trusted key;

validating, as a third part of the secure boot process, an immutable portion of a file using the first trusted key, wherein the file comprises at least one mutable portion and at least one immutable portion, and wherein the immutable portion is made immutable by using the first trusted key, the first trusted key corresponding to the immutable portion, and wherein the first trusted key is used by the processor to verify a signature associated with the file;

loading, as a fourth part of the secure boot process, the file responsive to each portion of the file being successfully validated, wherein the first part, the second part, the third part, and the fourth part of the secure boot process occur in succession and occur before an integrity management configuration takes over the secure boot process; and completing the secure boot process.

2. The method of claim 1, further comprising:

storing in a staging area a changed portion of the file;

computing, using a second trusted key, a new signature corresponding to the changed portion;

storing, responsive to the second key not being in the set of trusted keys, the new trusted key such that the new trusted key will be included in the set of trusted keys upon a reboot of the secure system; and instructing the reboot of the secure system.

3. The method of claim 2, further comprising:

configuring the staging area, wherein data saved in the staging area before rebooting the secure system remains accessible to the secure system after the rebooting.

4. The method of claim 2, further comprising:

verifying, as a first portion of a secure reboot process, the second trusted key using a second root key from the set of root keys;

validating the changed portion using the second trusted key responsive to the second trusted key receiving an affirmative verification; and loading the changed portion responsive to the second trusted key validating the changed portion during the secure reboot process.

5. The method of claim 1, further comprising:

storing in a staging area a changed portion of the file;

computing, using a second trusted key, a new signature corresponding to the changed portion, wherein the second trusted key is already a member of the set of trusted keys; and instructing a reboot of the secure system.

6. The method of claim 1, further comprising:

failing, responsive to receiving a negative validation of second immutable portion of the file, the secure boot process.

7. The method of claim 1, further comprising:

selecting a trust service provider system based on the first root key;

sending the first trusted key to the trust service provider system; and receiving one of an affirmative and a negative verification relative to the first trusted key.

8. The method of claim 7, further comprising:

sending the first root key to the trust service provider system.

9. The method of claim 1, further comprising:

failing, responsive to receiving a negative verification of a second trusted key from a trust service provider system, the secure boot process.

10. The method of claim 1, further comprising:

determining, during the validating, whether the signature stored relative to the immutable portion is computable using the first trusted key; and affirming a validity of the immutable portion responsive to a use of the first trusted key on the immutable portion resulting in the signature.

11. The method of claim 1, wherein the immutable portion of the file is an entirety of the file.

12. The method of claim 1, wherein a root key in the set of root keys comprises data that is inherently trusted without verification from a trust service provider system.

13. A computer usable program product comprising one or more computer-readable storage devices, and program instructions stored on at least one of the one or more storage devices, the stored program instructions comprising:

program instructions to load, using a processor and a memory, as a first part of a secure boot process of a secure system, a set of root keys;

program instructions to verify, as a second part of the secure boot process, a first trusted key from a set of trusted keys using a first root key from the set of root keys;

program instructions to load the set of trusted keys responsive to receiving affirmative verification for a subset of trusted keys, the subset of trusted keys including the first trusted key;

program instructions to validate, as a third part of the secure boot process, an immutable portion of a file using the first trusted key, wherein the file comprises at least one mutable portion and at least one immutable portion, and wherein the immutable portion is made immutable by using the first trusted key, the first trusted key corresponding to the immutable portion, and wherein the first trusted key is used by the processor to verify a signature associated with the file;

program instructions to load, as a fourth part of the secure boot process, the file responsive to each portion of the file being successfully validated, wherein the first part, the second part, the third part, and the fourth part of the secure boot process occur in succession and occur before an integrity management configuration takes over the secure boot process; and program instructions to complete the secure boot process.

14. The computer usable program product of claim 13, further comprising:

program instructions to store in a staging area a changed portion of the file;

program instructions to compute, using a second trusted key, a new signature corresponding to the changed portion;

program instructions to store, responsive to the second key not being in the set of trusted keys, the new trusted key such that the new trusted key will be included in the set of trusted keys upon a reboot of the secure system; and program instructions to instruct the reboot of the secure system.

15. The computer usable program product of claim 14, further comprising:
  program instructions to configure the staging area, wherein data saved in the staging area before rebooting the secure system remains accessible to the secure system after the rebooting.

16. The computer usable program product of claim 14, further comprising:
  program instructions to verify, as a first portion of a secure reboot process, the second trusted key using a second root key from the set of root keys;
  program instructions to validate the changed portion using the second trusted key responsive to the second trusted key receiving an affirmative verification; and
  program instructions to load the changed portion responsive to the second trusted key validating the changed portion during the secure reboot process.

17. The computer usable program product of claim 13, further comprising:
  program instructions to store in a staging area a changed portion of the file;
  program instructions to compute, using a second trusted key, a new signature corresponding to the changed portion, wherein the second trusted key is already a member of the set of trusted keys; and
  program instructions to instruct a reboot of the secure system.

18. The computer usable program product of claim 13, further comprising:
  program instructions to fail, responsive to receiving a negative validation of second immutable portion of the file, the secure boot process.

19. The computer usable program product of claim 13, further comprising:
  program instructions to select a trust service provider system based on the first root key;
  program instructions to send the first trusted key to the trust service provider system; and
  program instructions to receive one of an affirmative and a negative verification relative to the first trusted key.

20. The computer usable program product of claim 19, further comprising:
  program instructions to send the first root key to the trust service provider system.

21. The computer usable program product of claim 13, further comprising:
  program instructions to fail, responsive to receiving a negative verification of a second trusted key from a trust service provider system, the secure boot process.

22. The computer usable program product of claim 13, wherein the computer usable code is stored in a computer readable storage device in a data processing system, and wherein the computer usable code is transferred over a network from a remote data processing system.

23. The computer usable program product of claim 13, wherein the computer usable code is stored in a computer readable storage device in a server data processing system, and wherein the computer usable code is downloaded over a network to a remote data processing system for use in a computer readable storage device associated with the remote data processing system.

24. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
  program instructions to load, using a processor and a memory, as a first part of a secure boot process of a secure system, a set of root keys;
  program instructions to verify, as a second part of the secure boot process, a first trusted key from a set of trusted keys using a first root key from the set of root keys;
  program instructions to load the set of trusted keys responsive to receiving affirmative verification for a subset of trusted keys, the subset of trusted keys including the first trusted key;
  program instructions to validate, as a third part of the secure boot process, an immutable portion of a file using the first trusted key, wherein the file comprises at least one mutable portion and at least one immutable portion, and wherein the immutable portion is made immutable by using the first trusted key, the first trusted key corresponding to the immutable portion, and wherein the first trusted key is used by the processor to verify a signature associated with the file;
  program instructions to load, as a fourth part of the secure boot process, the file responsive to each portion of the file being successfully validated, wherein the first part, the second part, the third part, and the fourth part of the secure boot process occur in succession and occur before an integrity management configuration takes over the secure boot process; and
  program instructions to complete the secure boot process.

25. A method comprising:
  verifying, during a secure boot process of a secure system, a subset of trusted keys from a set of trusted keys using a first root key from a set of root keys, the subset of trusted keys including the first trusted key;
  validating, during the secure boot process, an immutable portion of a file using the first trusted key; and
  loading, during the secure boot process, the file responsive to each portion of the file being successfully validated, wherein the verifying, the validating, and the loading occur in succession and occur before an integrity management configuration takes over the secure boot process.

* * * * *